United States Patent
Itoh et al.

(10) Patent No.: US 6,837,538 B2
(45) Date of Patent: Jan. 4, 2005

(54) ROOF DEVICE FOR A VEHICLE

(75) Inventors: Kohichi Itoh, Kariya (JP); Tetsuya Hirata, Toyota (JP); Chitose Nishiyama, Handa (JP); Kazuki Sawada, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/367,781

(22) Filed: Feb. 19, 2003

(65) Prior Publication Data

US 2003/0155794 A1 Aug. 21, 2003

(30) Foreign Application Priority Data

Feb. 19, 2002 (JP) ........................................ 2002-042124

(51) Int. Cl.[7] .................................................. B60J 7/04
(52) U.S. Cl. ............. 296/216.06; 296/213; 296/216.02; 296/216.09
(58) Field of Search ................ 296/213, 216.02–216.03, 296/216.06, 216.09, 217, 220.01

(56) References Cited

U.S. PATENT DOCUMENTS 4,375,899 A * 3/1983 Kajiyama et al. ...... 296/216.09
5,306,069 A * 4/1994 Becker et al. ............... 296/217
5,601,330 A * 2/1997 Ulbrich et al. ............... 296/217

FOREIGN PATENT DOCUMENTS

| DE | 19804102 | * | 8/1999 | |
| JP | 360206725 | * | 10/1985 | ............ 296/216.06 |
| JP | 405085183 | * | 4/1993 | ............ 296/220.01 |
| WO | WO99/11479 | | 11/1999 | |

* cited by examiner

*Primary Examiner*—Dennis H. Pedder
(74) *Attorney, Agent, or Firm*—Finnegan, Henderson, Farabow, Garrett & Dunner, LLP

(57) ABSTRACT

A roof device for a vehicle is comprised of a first movable panel movable between a normal position which covers a part of the opening portion of the vehicle roof and an operation position in which a rear end portion of the first movable panel is raised with a front end portion of the fist movable panel as a pivoting point, a second movable panel placed at a rear direction of the first movable panel of the opening portion of the vehicle roof, and an edge member placed at the rear end portion of the first movable panel and extended in a width direction of the vehicle. Furthermore, the roof device is characterized in that a first groove portion is formed at the edge member.

9 Claims, 3 Drawing Sheets

ROOF DEVICE FOR A VEHICLE

CROSS REFERENCE OF RELATED APPLICATION

This application is based on and claims priority under 35 U.S.C. §119 with respect to Japanese Application No. 2002-42124 filed on Feb. 19, 2002, the entire content of which is incorporated herein by reference.

FIELD OF THE INVENTION

This invention relates to a roof device for a vehicle which opens and closes an opening portion mounted on a vehicle roof by a plurality of movable panels.

BACKGROUND OF THE INVENTION

A known device is disclosed in International Publication No. WO99/11479. The known device in the publication is mounted on an opening portion of a vehicle roof and has a plurality of movable panels, and each movable panel is movable between a normal position covering a part of the opening portion of the roof and an operation position in which a rear end portion of the movable panel is raised with a front end portion of the panel as a pivoting point. Also, the known device has a groove portion mounted in a front end of each movable panel, and the groove portion is extended in a width direction of a vehicle and is opening in an upward direction relative to the vehicle. The known device is structured in that when the movable panel moves to the operation position, water (rainwater etc.) on the movable panel is converged at a groove portion formed in the front portion of the movable panel.

However, even when the movable panel moves to the operation position, in other words, when the rear end portion of the movable panel is raised, the water on the movable panel runs toward the rear end portion because of a direction of air flow on the vehicle when the vehicle is running. As a result, there is a possibility that the water comes inside of the vehicle through an opened space formed by raising the rear end of the movable panel.

SUMMARY OF THE INVENTION

It is an object of the present invention to provide a roof device for a vehicle which prevents water from coming inside of the vehicle through an opened space formed by raising a rear end portion of the movable panel when a movable panel is positioned in an operation position while the vehicle is running According to the first aspect of the invention, a roof device for a vehicle is comprised of a first movable panel placed on a front portion of an opening portion of a vehicle roof and movable between a normal position which covers the front portion of the opening portion of the vehicle roof and an operation position in which a rear end portion of the first movable panel is raised with a front end portion of the first movable panel as a pivoting point, a second movable panel placed in a rear portion of the first movable panel placed on the opening portion of the vehicle roof, an edge member placed at the rear end portion of the first movable panel and extended in a width direction of the vehicle, and a first groove portion formed on the edge member at the rear end thereof, being extended in the width direction of the vehicle and opening in an upward direction relative to the vehicle.

According to the second aspect of the invention, the roof device for a vehicle is further comprised of a seal member placed at a space between the first movable panel and the second movable panel, a second groove portion formed in the seal portion, opening in the upward direction relative to the vehicle and extended in the width direction of the vehicle, and a convex portion formed in the edge member, extended in the width direction of the vehicle and projected in the downward direction relative to the vehicle. Furthermore, the convex portion is positioned above the second groove portion when the first movable panel is positioned in the operation position.

According to the third aspect of the invention, the seal member placed at the space between the first movable panel and the second movable panel is deformable.

According to the fourth aspect of the invention, the first movable panel and the second movable panel are made of a glass material and having rectangular shapes, the first movable panel being provided with the edge member at the rear end portion thereof, and the second movable being provided with a retainer at a front end portion to hold the seal member between the retainer and the edge member.

According to the fifth aspect of the invention, the second movable panel slides along a longitudinal direction of the vehicle.

According to the sixth aspect of the invention, the first movable panel and the second movable panel are made of a glass material and having rectangular shapes, the first movable panel being provided with the edge member at the rear end portion thereof, and the second movable being provided with a retainer at a front end portion to hold the seal member between the retainer and the edge member.

According to the embodiment of the present invention, with regard to the first movable panel mounted at an opening portion of a vehicle roof 11, a first groove portion opening in an upward direction relative to a vehicle is formed at an edge member placed at a rear portion of the first movable panel. Thus, when the first movable panel is positioned in an operation position, if water on the first movable panel runs toward the rear end portion of the first movable panel while the vehicle is running, the water is retained in the first groove portion, and a roof device prevents the water from coming inside of the vehicle through an opened space near the rear end portion of the first movable panel.

According to another embodiment of the invention, a convex portion projecting downward relative to the vehicle is formed at the edge member, and the convex portion is positioned above a second groove portion when the first movable panel is positioned in the operation position. Thus, the water is fallen into the second groove portion securely through the convex portion, preventing the water from coming into inside of the vehicle through the opened space near the rear end portion of the first movable panel.

BRIEF DESCRIPTION OF THE DRAWINGS

The foregoing and additional features and characteristics of the present invention will become more apparent from the following detained description considered with reference to the accompanying drawings in which like reference numerals designate like elements.

DETAILED DESCRIPTION OF THE INVENTION

An embodiment of a roof device according to the present invention will now be described with reference to the drawings.

Figure 1:
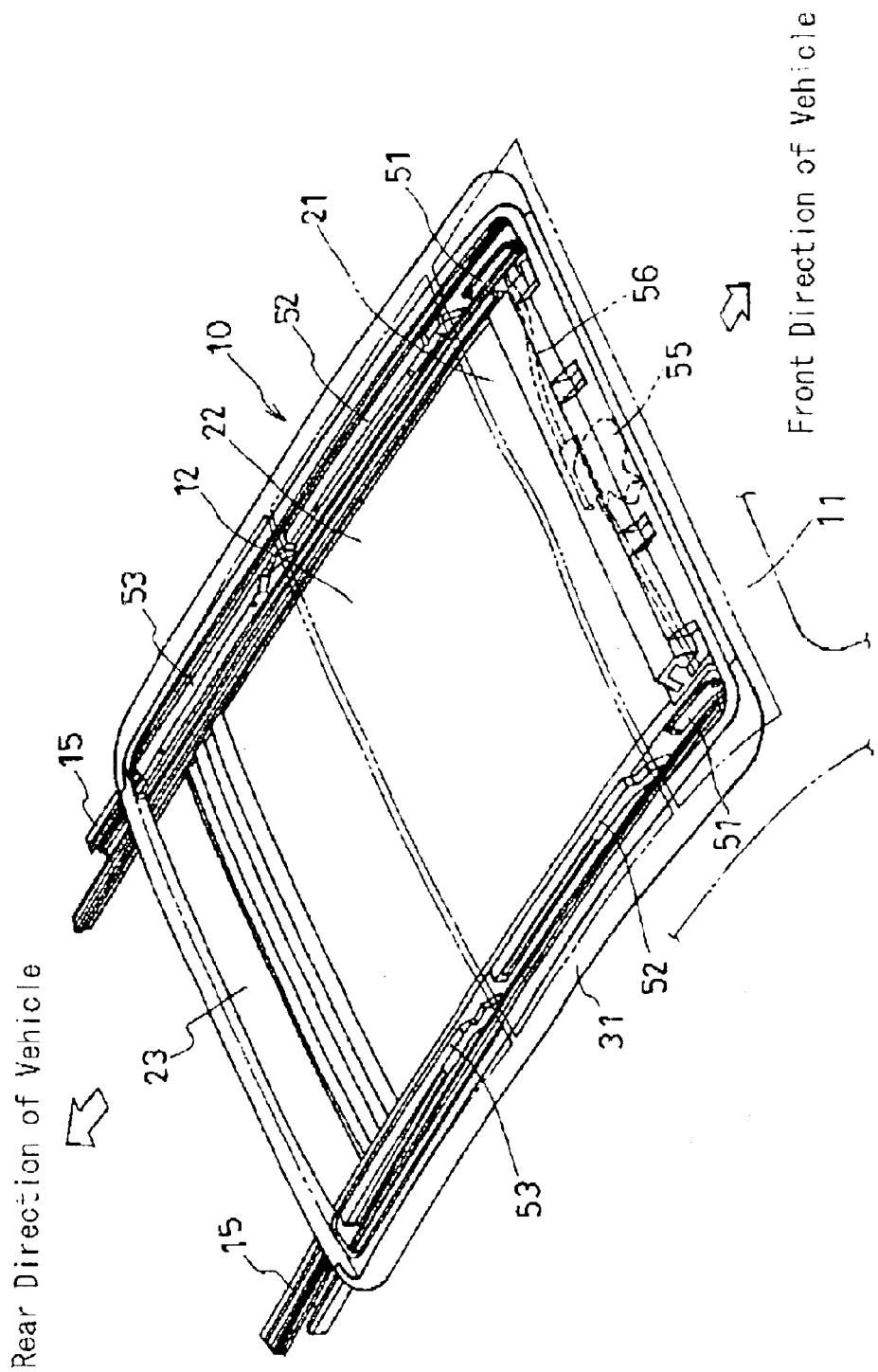
FIG. 1 is a perspective view of a vehicle roof in which a roof device is mounted according to an embodiment of the invention.
Figure 2:
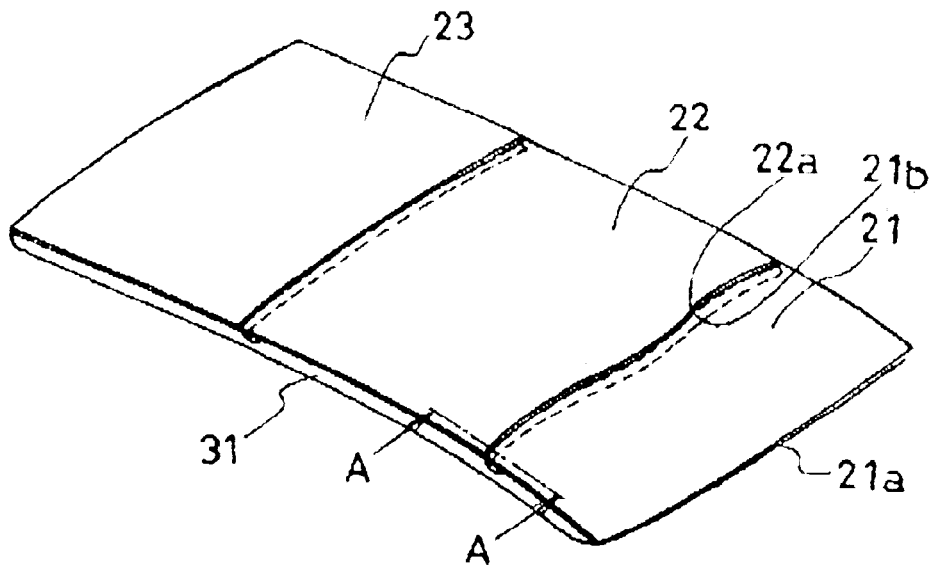
FIG. 2 is a perspective view showing movable panels of a roof device shown in FIG. 1 according to the embodiment of the invention.
Figure 3:
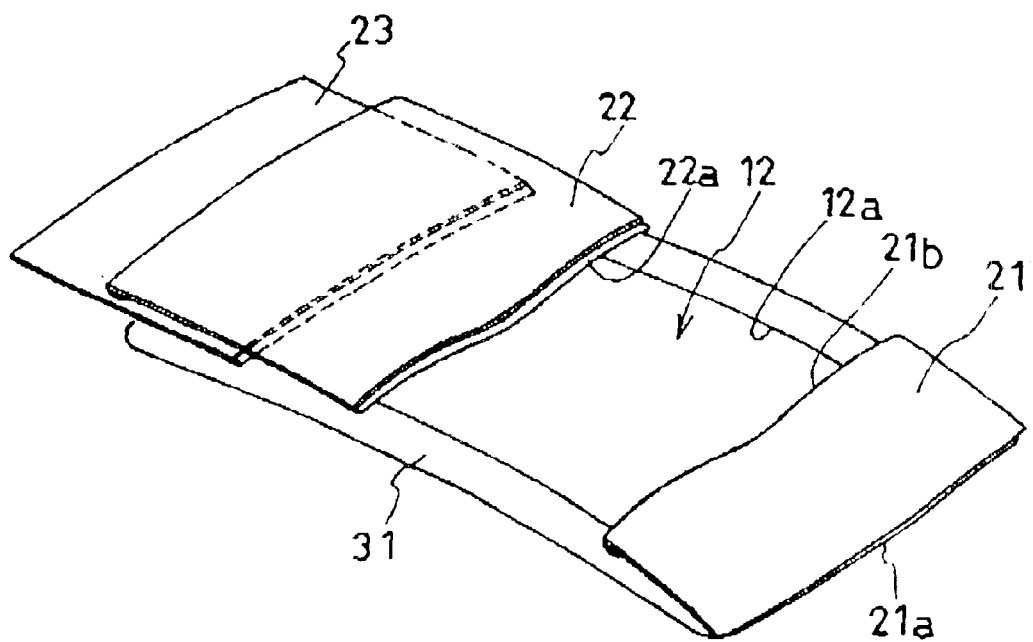
FIG. 3 is a perspective view showing an open condition of the movable panels of a roof device shown in FIG. 2 according to the embodiment of the invention.

FIG. 1 is a perspective view of a roof device for a vehicle according to a first embodiment of the invention, showing a roof device 10 (a roof device for a vehicle) placed on a vehicle roof 11 (a vehicle roof). FIG. 2 and FIG. 3 are perspective views of an appearance of the roof device 10, and FIG. 3 shows an open condition of the roof device 10.

An opening portion 12 (an opening portion of a vehicle roof) is formed in a vehicle roof 11, and a housing 31, which is a basic component member of the roof device 10, is attached to a frame along the opening portion 12 by a bolt (not shown). The housing 31 is rectangular-shaped and has an opening in its central portion.

In a lower surface of the housing 31, a pair of guide rails 15 are placed at right and left sides of the opening portion 12 of the vehicle roof 11 and they are extended toward a front and rear direction of a vehicle. A first a pair of operation arms 51 are fixed to the guide rails 15 so that the first operation arms 51 can raise a rear end portion of a first movable panel 21 with a front end of the panel as a pivoting point by a rotation mechanism (not shown). A second pair of operation arms 52 and a third pair of operation arms 53 are placed at a rear side and at a further rear side of the first operation arms 51 respectively, and they are structured to be able to move in a front and back direction of a vehicle along the guide rails 15. In addition, they are also able to raise their rear portions with their front ends as pivoting points. These movements of the second and the third operation arms 52 and 53 are operated by a rotation and sliding mechanism (not shown).

The rotation mechanism of the first operation arms 51 and the rotation and sliding mechanisms of the second and the third operation arms 52 and 53 are connected to a cable 56 which is extended from a drive device 55 attached at a lower surface of a vehicle front side of the housing 31. The rotation mechanism of the first operation arms 51 and the rotation and sliding mechanism of the second and the third operation arms 52 and 53 are operated to slide and rotate respectively by the drive device 55.

The roof device 10 has a plurality of movable panels which are usually made of glass plates, and they are extended from right through left of the opening portion 12 of the vehicle roof 11. In this embodiment, each movable panel is referred to as a first movable panel 21(a first movable panel), a second movable panel 22 (a second movable panel), and a third movable panel 23 (a third movable panel) in order from the front of the vehicle respectively. The first movable panel 21, the second movable panel 22, and the third movable panel 23 are fixed to the first operation arms 51, second operation arms 52, and the third operation arms 53 through attachment frames (not shown) respectively. The first movable panel 21 is usually positioned in a normal position which covers a part of a vehicle front side of the opening portion 12 of the vehicle roof 11. When the first arms 51 are operated by an operation of the drive device 55, the first movable panel 21 is moved to an operation position in which a rear end portion 21b (a rear end portion shown in FIG. 2) of the first movable panel 21 is lifted with a front end portion 21a (a front end portion shown in FIG. 2) as an axis of a rotation. In other words, the first movable panel 21 is structured to be able to operate a tilt-up movement. On the other hand, the second movable panel 22 and the third movable panels 23 are structured to be able to move in the front and back direction of the vehicle in addition to the tilt-up movement.

Next, a structure between the first movable panel 21 and the second movable panel 22 will be described based on FIG. 4. A liner 24 (an edge member) made of resin is fixed at the rear end portion 21b of the first movable panel 21, and a retainer 25 made of resin is molded and fixed at a front end portion 22a of the second movable panel 22 respectively. In addition, a weather strip 26 (a seal member) is fixed on the retainer 25.

By covering the rear end portion 21b of the first movable panel 21 in a width direction of the vehicle, the liner 24 adjusts an entire profile of the first movable panel 21 and establishes dimensional accuracy of the profile. Also, a metal reinforcement member 27 is fixed at an inner surface 21d of the first movable panel 21, extended in the width direction of the vehicle, and the reinforcement member 27 is covered by the liner 24. And, a good appearance of the inner surface 21d of the first movable panel 21 is obtained. Moreover, a groove portion 24a (a first groove portion) which is extended in the width direction of the vehicle and opens in an upward direction relative to the vehicle is formed at a vehicle rear side of the liner 24. The groove portion 24a is positioned downward relative to the vehicle rather than an outer surface 21e (an upper side surface in FIG. 4) which is an outside design surface of the vehicle. Furthermore, a convex portion 24b which is extended in the width direction of the vehicle and is projected downward relative to the vehicle is formed at the vehicle rear end of the liner 24.

By covering the front end portion 22a of the second movable panel 22 by extending to the width direction of the vehicle, the retainer 25 adjusts an entire profile of the second movable panel 22 and establishes dimensional accuracy of the profile. Also, at an inner surface 22b of the vehicle (a lower surface in FIG. 4) of the second movable panel 22, a metal reinforcement member 28 extended in the width direction of the vehicle is fixed, and the retainer 28 covers the reinforcement member 25. Therefore, an good appearance of the inner surface 22b of the vehicle is obtained.

A weather strip 26 is extended in the width direction of the vehicle along the retainer 25. Furthermore, the weather strip 26 has two hollow portions 26a and 26b placed at a front and back direction of the vehicle (a right and left direction in FIG. 4). Also, a groove portion 26c (a second groove portion) is formed between the hollow portions 26a and 26b. When the first movable panel 21 is in a normal position, in other words, when the first movable panel 21 is in a fully closed condition covering the opening portion 12, the hollow portions 26a and 26b are deformed elastically, being pushed by the first movable panel 21.

Next, an operation of the roof device 10, particularly an operation of the first movable panel will be described.

Figure 4:
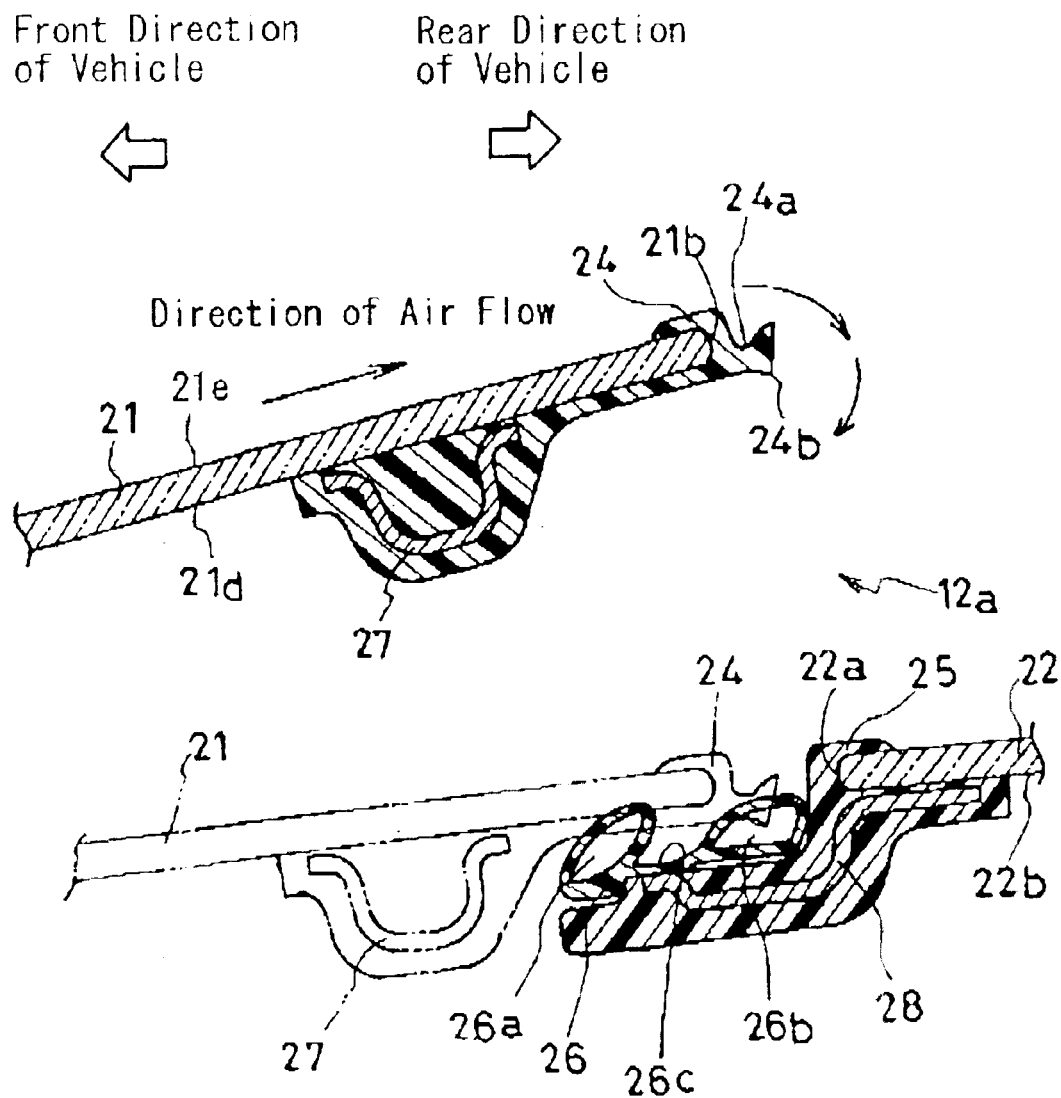
FIG. 4 is a cross sectional view taken along a line A—A shown in FIG. 2.

In a normal condition, the first movable panel 21 is positioned in the normal position which covers the part of the front portion of the vehicle of the opening portion 12 of the vehicle roof 11 (a chain line in FIG. 4), and by the operation of the drive device 55, the first movable panel 21 is positioned in a tilt-up position by the operation of the first operation arms 51 (a solid line in FIG. 4). Thus, an opened space 12a is formed between the liner 24 and the retainer 25. As shown in FIG. 4, when the vehicle runs in this condition, air flows in a rear direction of the vehicle (a light direction in FIG. 4) along an upper portion of an outer surface 21e of the first movable panel 21. Moreover, a part of the air comes inside of the vehicle through the opened space 12a of the vehicle roof 11. Therefore, when drops of water such as rainwater are attached on the outer surface 12a, they run toward the rear portion 21b of the first movable panel 21 from the outer surface 21e. When the drops of water reach to the liner 24, they are retained in the groove portion 24a. Therefore, by retaining the drops of water in the groove portion 24a, the roof device 10 prevents the water from coming inside of the vehicle through the opening portion 12a. In addition, the groove portion 24a is formed in a position one step lower than the outer surface 21e. In this structure, since the water retained in the groove portion 24a is hardly affected by the direction of the airflow, there is little possibility that the water retained in the groove portion 24a jumps out from the groove portion 24a.

When the water retained in the groove 24a becomes more than a predetermined amount, the water reaches to the groove portion 24b through the rear end portion of the liner 24b. In this structure, since the convex portion is projected downward relative to the vehicle, the water reaches to an edge portion of the convex portion 24b. If the convex portion 24b is not formed, there is a possibility that the water runs in a front direction of the vehicle through the inner surface 21d of the liner 24 because of an inclination of the first movable panel 21. However, since the convex portion 21b is pointed, the water drops at the convex portion. Furthermore, since the convex portion 24b is positioned above the groove portion 26c of the retainer 25, the water is received by the groove portion 26c securely. By this structure, the roof device 10 efficiently prevents the water from coming inside of the vehicle from the opened space 12a when the vehicle is running.

In addition, since the liner 24 is a necessary member to form the first movable panel 21, and the groove portion 24a and the convex portion 24b are formed in the necessary member (the liner 24), the number of parts is reduced compared to a case when extra members are added to have the same functions.

What is claimed is:

1. A roof device for a vehicle comprising;
   a first movable panel placed on a front portion of an opening portion of a vehicle roof and movable between a normal position which covers the front portion of the opening portion of the vehicle roof and an operation position in which a rear end portion of the first movable panel is raised with a front end portion of the first movable panel as a pivoting point;
   a second movable panel placed in a rear portion of the first movable panel placed on the opening portion of the vehicle roof;
   an edge member placed at the rear end portion of the first movable panel and extended in a width direction of the vehicle; and
   a first groove portion formed on the edge member at the rear end thereof, being extended in the width direction of the vehicle and opening in an upward direction relative to the vehicle the groove portion positioned lower than an upper surface of the first movable panel.

2. A roof device for a vehicle according to claim 1, further comprising;
   a seal member placed at a space between the first movable panel and the second movable panel;
   a second groove portion formed in the seal member, opening in the upward direction relative to the vehicle and extended in the width direction of the vehicle; and
   a convex portion formed in the edge member, extended in the width direction of the vehicle and projected in the downward direction relative to the vehicle, wherein the convex portion is positioned above the second groove portion when the first movable panel is positioned in the operation position.

3. A roof device for a vehicle according to claim 2, wherein the seal member is deformable.

4. A roof device for a vehicle according to claim 1, wherein the first movable panel and the second movable panel are made of a glass material and having tetragonal shapes, the second movable panel being provided with a retainer at a front end portion to hold a seal member between the retainer and the edge member.

5. A roof device for a vehicle according to claim 1, wherein the second movable panel moves in a longitudinal direction of the vehicle.

6. A roof device for a vehicle comprising;
   a first movable panel placed on a front portion of an opening portion of a vehicle roof and movable between a normal position which covers the front portion of the opening portion of the vehicle roof and an operation position in which a rear end portion of the first movable panel is raised with a front end portion of the first movable panel as a pivoting point;
   a second movable panel placed in a rear portion of the first movable panel placed on the opening portion of the vehicle roof;
   an edge member placed at the rear end portion of the first movable panel and extended in a width direction of the vehicle;
   a first groove portion formed on the edge member, being extended in the width direction of the vehicle and opening in an upward direction relative to the vehicle the groove portion positioned lower than an upper surface of the first movable panel;
   a seal member placed at a space between the first movable panel and the second movable panel;
   a second groove portion formed in the seal member, opening in the upward direction relative to the vehicle and extended in the width direction of the vehicle; and
   a convex portion formed at a lower side of the edge member, extended in the width direction of the vehicle and projected in the downward direction relative to the vehicle, wherein the convex portion is positioned above the second groove portion when the first movable panel is positioned in the operation position.

7. A roof device for a vehicle according to claim 3, wherein the first movable panel and the second movable panel are made of a glass material and having tetragonal shapes, the first movable panel being provided with the edge member at the rear end portion thereof, and the second movable being provided with a retainer at a front end portion to hold the seal member between the retainer and the edge member.

8. A roof device for a vehicle according to claim 6, wherein the seal member is deformable.

9. A roof device for a vehicle according to claim 6, wherein the second movable panel moves in the longitudinal direction of the vehicle.

* * * * *